United States Patent
Kuriyama et al.

(10) Patent No.: US 9,692,042 B2
(45) Date of Patent: Jun. 27, 2017

(54) NONAQUEOUS ELECTROLYTE BATTERY AND BATTERY PACK

(71) Applicant: Kabushiki Kaisha Toshiba, Minato-ku (JP)

(72) Inventors: Hiromichi Kuriyama, Kashiwazaki (JP); Hidesato Saruwatari, Kashiwazaki (JP); Tetsuro Kano, Kashiwazaki (JP); Yuki Watanabe, Kashiwazaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 170 days.

(21) Appl. No.: 14/644,826

(22) Filed: Mar. 11, 2015

(65) Prior Publication Data
US 2016/0036039 A1    Feb. 4, 2016

(30) Foreign Application Priority Data

Jul. 31, 2014 (JP) .................. 2014-156469
Mar. 5, 2015 (JP) .................. 2015-043902

(51) Int. Cl.
*H01M 2/24* (2006.01)
*H01M 6/42* (2006.01)
(Continued)

(52) U.S. Cl.
CPC ........... *H01M 4/131* (2013.01); *H01M 4/366* (2013.01); *H01M 4/505* (2013.01); *H01M 4/525* (2013.01);
(Continued)

(58) Field of Classification Search
CPC ........ H01M 4/13; H01M 4/131; H01M 4/139; H01M 4/1391; H01M 4/48; H01M 4/483;
(Continued)

(56) References Cited

U.S. PATENT DOCUMENTS

| 5,686,203 A | 11/1997 | Idota et al. | |
|---|---|---|---|
| 2005/0147889 A1* | 7/2005 | Ohzuku | H01M 4/131 |
| | | | 429/231.1 |

(Continued)

FOREIGN PATENT DOCUMENTS

| CN | 161484808 | 5/2005 |
|---|---|---|
| CN | 101000960 | 7/2007 |

(Continued)

OTHER PUBLICATIONS

Extended European Search Report issued Dec. 10, 2015 in Patent Application 15158606.2.

(Continued)

*Primary Examiner* — Eli Mekhlin
(74) *Attorney, Agent, or Firm* — Oblon, McClelland, Maier & Neustadt, L.L.P.

(57) ABSTRACT

According to one embodiment, there is provided a nonaqueous electrolyte battery. The nonaqueous electrolyte battery includes a negative electrode, a positive electrode, and a nonaqueous electrolyte. An Li-atom abundance ratio $A_{Li}$, Ti-atom abundance ratio $A_{Ti}$, and C-atom abundance ratio $A_C$ of a surface of the negative electrode satisfy inequalities $2 \leq A_C/A_{Ti} \leq 10$, and $1.0 \leq A_{Li}/A_C \leq 1.5$. The positive electrode includes a nickel-cobalt-manganese composite oxide represented by a composition formula $Li_{1-a}Ni_xCo_yMn_zO_2$. Subscripts x, y, and z satisfy an inequality $0.1 \leq x/(y+z) \leq 1.3$, and subscript a satisfies an inequality $0 \leq a \leq 1$. A ratio p/n of a capacity p of the positive electrode to a capacity n of the negative electrode is within a range of 1.2 to 2.

9 Claims, 5 Drawing Sheets

(51) Int. Cl.
*H01M 4/131* (2010.01)
*H01M 4/505* (2010.01)
*H01M 10/0525* (2010.01)
*H01M 4/525* (2010.01)
*H01M 4/36* (2006.01)
*H01M 4/02* (2006.01)
*H01M 2/02* (2006.01)
*H01M 4/485* (2010.01)
*H01M 10/42* (2006.01)

(52) U.S. Cl.
CPC ...... *H01M 10/0525* (2013.01); *H01M 2/0285* (2013.01); *H01M 2/0287* (2013.01); *H01M 4/485* (2013.01); *H01M 2004/027* (2013.01); *H01M 2004/028* (2013.01); *H01M 2010/4292* (2013.01)

(58) Field of Classification Search
CPC ........ H01M 4/485; H01M 4/50; H01M 4/502; H01M 4/505; H01M 4/52; H01M 4/525
See application file for complete search history.

(56) References Cited

U.S. PATENT DOCUMENTS

| | | |
|---|---|---|
| 2005/0221170 A1 | 10/2005 | Takeuchi et al. |
| 2010/0255352 A1* | 10/2010 | Inagaki ............... H01M 2/1077 429/7 |
| 2011/0067230 A1 | 3/2011 | Tan et al. |
| 2014/0141323 A1 | 5/2014 | Saruwatari et al. |

FOREIGN PATENT DOCUMENTS

| | | |
|---|---|---|
| EP | 1 530 248 A2 | 5/2005 |
| EP | 2 624 339 A1 | 8/2013 |
| EP | 2 677 570 A1 | 12/2013 |
| JP | 2008-91327 | 4/2008 |
| JP | 2013-541161 | 11/2013 |

OTHER PUBLICATIONS

Tsutomu Ohzuku, et al, "Layered Lithium Insertion Material of $LiCo_{1/3}Ni_{1/3}Mn_{1/3}O_2$ for Lithium-Ion Batteries" Chemistry Letters, The Chemical Society of Japan, XP009015329, 2001, pp. 642-643.

Tsutomu Ohzuku, et al, "Zero-Strain Insertion Material of $Li[Li_{1/3}Ti_{5/3}]O_4$ for Rechargeable Lithium Cells", Journal of the Electrochemical Society, vol. 142, No. 5, XP-002401881, May 1995, pp. 1431-1435.

U.S. Appl. No. 14/645,846, filed Mar. 12, 2015, Kano, et al.

Office Action as received in the corresponding China Patent Application 201510104570.X dated Apr. 10, 2017.

* cited by examiner

NONAQUEOUS ELECTROLYTE BATTERY AND BATTERY PACK

CROSS-REFERENCE TO RELATED APPLICATIONS

This application is based upon and claims the benefit of priority from the Japanese Patent Application No. 2014-156469, filed Jul. 31, 2014; and No. 2015-043902 filed Mar. 5, 2015, the entire contents of all of which are incorporated herein by reference.

FIELD

Embodiments described herein relate generally to a nonaqueous electrolyte battery and a battery pack.

BACKGROUND

In order to decrease a positive electrode potential during over-charge, a positive electrode capacity has been made excessive with respect to a negative electrode capacity, thus far. This is a strategy that takes advantage of the fact that by making the positive electrode capacity larger than the negative electrode capacity, it is possible suppress an increase in the potential of the positive electrode during over-charge and thereby suppress rapid heat generation.

In a cell in which the ratio p/n of the positive electrode capacity to the negative electrode capacity largely exceeds 1, the potential of a negative electrode significantly decreases during over-charge. As a result, there is a problem of a decrease in safety. The reason will be described below. In a battery in which the capacity of the negative electrode is relatively lower than the capacity of the positive electrode, when the battery is fully charged, the negative electrode is in a fully charged state. However, the positive electrode is in a state capable of being charged further. In the case where the battery in such a fully charged state is further charged, thereby reaching an overcharged state, the potential of the negative electrode becomes rapidly decreased. A significant decrease in the potential of the negative electrode causes a side reaction between the surface of the negative electrode and an electrolyte solution to be accelerated, and heat may be generated, accompanied with the side reaction. The heat increases the temperature of the interior of the nonaqueous electrolyte battery, which may result in a decrease in the safety of the nonaqueous electrolyte battery.

DETAILED DESCRIPTION

Figure 1:
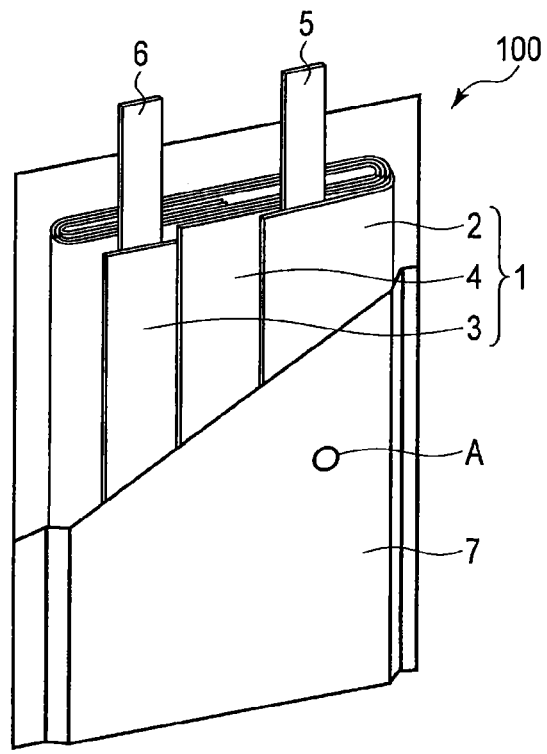
FIG. 1 is a partially cutout perspective view of a nonaqueous electrolyte battery of a first example according to a first embodiment.

According to a first embodiment, there is provided a nonaqueous electrolyte battery. The nonaqueous electrolyte battery includes a negative electrode, a positive electrode, and a nonaqueous electrolyte. The negative electrode includes an oxide of titanium. An Li-atom abundance ratio $A_{Li}$, Ti-atom abundance ratio $A_{Ti}$, and C-atom abundance ratio $A_C$ obtained by subjecting a surface of the negative electrode to a photoelectron spectroscopy measurement satisfy inequalities $2 \leq A_C/A_{Ti} \leq 10$, and $1.0 \leq A_{Li}/A_C \leq 1.5$. The positive electrode includes a nickel-cobalt-manganese composite oxide. The nickel-cobalt-manganese composite oxide is represented by a composition formula $Li_{1-a}Ni_xCo_yMn_zO_2$. Here, subscripts x, y, and z satisfy an inequality $0.1 \leq x/(y+z) \leq 1.3$, and subscript a satisfies an inequality $0 \leq a \leq 1$. A ratio p/n of a capacity p of the positive electrode to a capacity n of the negative electrode is within a range of 1.2 to 2.

According to a second embodiment, there is provided a battery pack. The battery pack includes a nonaqueous electrolyte battery according to the first embodiment.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided a nonaqueous electrolyte battery. The nonaqueous electrolyte battery includes a negative electrode, a positive electrode, and a nonaqueous electrolyte battery. The negative electrode includes an oxide of titanium. An Li-atom abundance ratio $A_{Li}$, Ti-atom abundance ratio $A_{Ti}$, and C-atom abundance ratio $A_C$ obtained by subjecting a surface of the negative electrode to a photoelectron spectroscopy measurement satisfy inequalities $2 \leq A_C/A_{Ti} \leq 10$, and $1.0 \leq A_{Li}/A_C \leq 1.5$. The positive electrode includes a nickel-cobalt-manganese composite oxide. The nickel-cobalt-manganese composite oxide is represented by a composition formula $Li_{1-a}Ni_xCo_yMn_zO_2$. Here, subscripts x, y, and z satisfy an inequality $0.1 \leq x/(y+z) \leq 1.3$, and subscript a satisfies an inequality $0 \leq a \leq 1$. A ratio p/n of a capacity p of the positive electrode to a capacity n of the negative electrode is within a range of 1.2 to 2.

The nickel-cobalt-manganese composite oxide represented by the composition formula $Li_{1-a}Ni_xCo_yMn_zO_2$ ($0.1 \leq x/(y+z) \leq 1.3$, $0 \leq a \leq 1$) included in the positive electrode suppresses an increase in the valence of Ni. In such a positive electrode, the thermal stability during over-charge can be improved.

In the nickel-cobalt-manganese composite oxide represented by the composition formula $Li_{1-a}Ni_xCo_yMn_zO_2$, when the value of $x/(y+z)$ is less than 0.1, the positive electrode potential increases, since during charge and discharge, the valence of Co changes mainly. When the positive electrode potential increases, oxidative decomposition of the electrolyte solution at the positive electrode is facilitated during over-charge. This causes heat generation. The thus generated heat leads to a decrease in safety. On the other hand, in the nickel-cobalt-manganese composite oxide represented by the composition formula $Li_{1-a}Ni_xCo_yMn_zO_2$, when the value of $x/(y+z)$ is greater than 1.3, the valence of Ni increases. When the valence of Ni increases, the thermal stability during over-charge is reduced.

It is preferable that the value of $x/(y+z)$ is from 0.3 to 1.3, and y and z satisfy $y \geq z$. If the value of $x/(y+z)$ is 0.3 or greater, the positive electrode potential can be further reduced. Thus, the oxidative decomposition of the electrolyte solution during over-charge can be suppressed. In the case of $y \geq z$, a crystal structure can be further stabilized. Thus, an effect can be obtained, in which heat generation accompanied by oxygen release during over-charge is suppressed.

It is preferable that the value of $x/(y+z)$ is from 0.6 to 1.0, and y and z satisfy $y \geq z$. When the value of $x/(y+z)$ is 0.6 or greater, it is possible to further obtain an effect of suppressing oxidative decomposition of the electrolyte solution by suppressing an increase in the positive electrode potential. In the case where the value of $x/(y+z)$ is 1.0 or less, the effect of preventing the valence of Ni from increasing during over-charge is further enhanced.

A subscript a in the composition formula $Li_{1-a}Ni_xCo_yMn_zO_2$ of the nickel cobalt manganese composite oxide included in the positive electrode represents a desorption amount of Li per 1 mol of the nickel cobalt manganese composite oxide.

In the nonaqueous electrolyte battery according to the first embodiment, the reaction of the negative electrode surface with the nonaqueous electrolyte can be prevented based on the following reasons. As a result, heat generation can be prevented in the nonaqueous electrolyte battery according to the first embodiment.

In the negative electrode having a surface state in which the Li-atom abundance ratio $A_{Li}$, Ti-atom abundance ratio $A_{Ti}$, and C-atom abundance ratio $A_C$ obtained by photoelectron spectroscopy satisfy the inequalities $2 \leq A_C/A_{Ti} \leq 10$, and $1.0 \leq A_{Li}/A_C \leq 1.5$, a protective coating is formed on the surface of the oxide of titanium. Such a protective coating can suppress a side reaction of particles of the oxide of titanium with the electrolyte solution on the surface thereof. The negative electrode having such a surface state can suppress the excessive insertion of Li into the oxide of titanium during over-charge because of a high Li concentration on the surface. Therefore, in the nonaqueous electrolyte battery according to the first embodiment, the oxide of titanium of the negative electrode can be prevented from getting into an overcharged state, and the significant decrease of the negative electrode potential can be prevented. Thus, the nonaqueous electrolyte battery according to the first embodiment can prevent the reaction of the negative electrode surface with the nonaqueous electrolyte and prevent the generation of heat during the end stage of charge.

When the ratio $A_C/A_{Ti}$ is less than 2, it is difficult to sufficiently protect the active sites on the surface of the negative electrode, which are involved in the side reaction with the electrolyte solution. As a result, the effect of suppressing the side reaction cannot be sufficiently obtained. When the ratio $A_C/A_{Ti}$ is greater than 10, excessive insulating performance is given to the negative electrode. In such a case, the potential of the negative electrode becomes rapidly decreased by over-voltage during over-charge. When the potential of the negative electrode becomes rapidly decreased, the negative electrode undergoes a side reaction with the nonaqueous electrolyte, which may result in generation of heat in the battery.

Further, when the ratio $A_{Li}/A_C$ is less than 1.0, the excessive insertion of Li into the oxide of titanium cannot be prevented sufficiently. This causes a decrease in potential. When the ratio $A_{Li}/A_C$ is greater than 1.5, the insulating performance of the negative electrode becomes excessive. In such a case, the potential of the negative electrode becomes rapidly decreased by the over-voltage during over-charge.

Even if the surface of the oxide of titanium is coated with a carbon protective layer having conductivity, the effect of suppressing the side reaction on the negative electrode surface cannot be obtained. This is because with the carbon protective layer having conductivity, electrons can be transmitted and received at the interface between the negative electrode active material and the electrolyte solution, whereby the side reaction on the negative electrode surface cannot be suppressed.

The ratio $A_C/A_{Ti}$ on the surface of the negative electrode may depend on the generation of carbon-including compounds on the surface of particles of the oxide of titanium. Such a C-including compound includes at least one of a C—Li bond, a C—C bond, a C—H bond, a $CF_2$—$CH_2$ bond, a C—O bond, a C—N bond, a C=O bond, and an O=C—O bond.

The ratio $A_{Li}/A_C$ on the surface of the negative electrode may be dependent on the formation of lithium-including compounds on the surface of particles of the oxide of titanium. Such an Li-including compound may be dependent on, for example, a composition of a material that constitutes the particles of the oxide of titanium, a composition of the nonaqueous electrolyte, and a moisture content in the nonaqueous electrolyte, and may include one or more compounds. Examples of compounds include lithium fluoride (LiF), lithium oxide ($Li_2O$), lithium hydroxide (LiOH), lithium carbonate ($Li_2CO_3$), lithium hydrogen carbonate ($LiHCO_3$), and lithium alkyl carbonate (ROCOOLi: R represents a hydrocarbon group).

A nonaqueous electrolyte battery including the negative electrode with such a surface state can be produced by comprehensively combining conditions such as a selection of materials, manufacturing conditions, and conditions of initial charging and aging. For example, the nonaqueous electrolyte battery according to the embodiment can be produced by a procedure described in the following examples.

The capacity ratio p/n of the positive electrode capacity p to the negative electrode capacity n is set to 1.2 to 2. Thereby, the increase in the potential of the positive electrode can be suppressed, and the generation of heat from the positive electrode can be suppressed. On the other hand, when the ratio p/n is less than 1.2, the increase in the potential of the positive electrode during over-charge cannot be sufficiently suppressed, which is apt to cause rapid generation of heat accompanied by oxygen release from the positive electrode and an oxidative decomposition reaction of an electrolyte solution. When the ratio p/n is greater than 2.0, a positive electrode mixture layer has an increased thickness since an excessive amount of the positive electrode active material is supported on a current collecting foil.

The electrical resistance of the positive electrode is increased due to the increased thickness of the positive electrode mixture layer. For this reason, the potential of the positive electrode is apt to be increased by the electrical resistance, thereby causing the oxidative decomposition reaction of the electrolytic solution, and decreasing safety as a result of the generation of heat.

Thus, even in an overcharged state, the nonaqueous electrolyte battery according to the first embodiment can both suppress heat generation caused by a side reaction on the surface of the negative electrode active material and suppress rapid generation of heat from the positive electrode. As a result, the nonaqueous electrolyte battery according to the first embodiment can exhibit improved safety.

Next, a nonaqueous electrolyte battery according to a first embodiment will be described in more detail.

The nonaqueous electrolyte battery according to the first embodiment includes a negative electrode, a positive electrode, and a nonaqueous electrolyte.

The negative electrode may include a negative electrode current collector and a negative electrode mixture layer formed on the negative electrode current collector.

The negative electrode current collector may include on a surface, a portion that does not support the negative electrode mixture layer. The portion can function as a negative electrode tab. Alternatively, the negative electrode may also further include a negative electrode tab independent from the negative electrode current collector.

As a negative electrode active material, an oxide of titanium may be included in the negative electrode mixture layer. The negative electrode mixture layer may further include a conductive agent and a binder if needed.

The positive electrode may include a positive electrode current collector and a positive electrode mixture layer formed on the positive electrode current collector. The positive electrode current collector may include on a surface, a portion that does not support the positive electrode mixture layer. The portion can function as a positive electrode tab. Alternatively, the positive electrode may also further include a positive electrode tab independent from the positive electrode current collector.

As a positive electrode active material, the positive electrode mixture layer may include a nickel-cobalt-manganese composite oxide. The positive electrode mixture layer may further include a conductive agent and a binder, if needed.

The positive electrode and the negative electrode can constitute an electrode group. In the electrode group, the positive electrode mixture layer and the negative electrode mixture layer may be opposed to each other interposing, for example, a separator. The electrode group can have various structures. For example, the electrode group may have a stacked structure. The electrode group having the stacked structure can be obtained by stacking, for example, a plurality of positive electrodes and negative electrodes with the separator sandwiched between the positive electrode mixture layer and the negative electrode mixture layer. Alternatively, the electrode group may have a wound structure. The wound electrode group can be obtained, for example, by laminating a separator, a positive electrode, another separator, and a negative electrode in this order to produce a laminate, and winding the laminate so that the negative electrode is positioned outside.

The nonaqueous electrolyte battery may further include a negative electrode terminal and a positive electrode terminal. The negative electrode terminal can function as a conductor for electron transfer between the negative electrode and an external terminal by electrically connecting a part of the negative electrode terminal to a part of the negative electrode. The negative electrode terminal may be connected to, for example, the negative electrode current collector, particularly the negative electrode tab. Similarly, the positive electrode terminal may function as a conductor for electron transfer between the positive electrode and an external circuit by electrically connecting a part of the positive electrode terminal to a part of the positive electrode. The positive electrode terminal may be connected to, for example, the positive electrode current collector, particularly the positive electrode tab.

The nonaqueous electrolyte battery according to the first embodiment may further include a container. The container can house the electrode group and the nonaqueous electrolyte. The electrode group may be impregnated with the nonaqueous electrolyte in the container. A part of the positive electrode terminal and a part of the negative electrode terminal may extend out from the container.

Hereinafter, the negative electrode, the positive electrode, the nonaqueous electrolyte, the separator, the positive electrode terminal, the negative electrode terminal, and the container will be described in more detail.

(1) Negative Electrode

A sheet including a material having high electrical conductivity may be used as the negative electrode current collector. For example, an aluminum foil or an aluminum alloy foil may be used as the negative electrode current collector. When the aluminum foil or the aluminum alloy foil is used, the thickness is, for example, 20 μm or less, and preferably 15 μm or less. The aluminum alloy foil may include one or more of magnesium, zinc, silicon, or the like. The amount of transition metals such as iron, copper, nickel, and chromium included in the aluminum alloy foil is preferably 1% or less.

The oxide of titanium included in the negative electrode is preferably at least one selected from the group consisting of a lithium-titanium composite oxide having a spinel type structure ($Li_{4+x}Ti_5O_{12}$ (a subscript x varies between 0 and 3 according to a state of charge)), lithium titanate having a ramsdellite type structure ($Li_{2+x}Ti_3O_7$ (a subscript x varies between 0 and 2 according to a state of charge)), monoclinic titanium dioxide ($Li_xTiO_2$ (B) (a subscript x varies between 0 and 1 according to a state of charge)), and a monoclinic niobium-titanium composite oxide (for example, $Li_xNb_2TiO_7$ (a subscript x varies between 0 and 4 according to a state of charge). More preferably, the oxide if titanium is the lithium-titanium composite oxide having a spinel type structure.

A negative electrode mixture layer may include negative electrode active material particles including an oxide of titanium. The negative electrode active material particles preferably have an average primary particle size of 5 μm or less. When the average primary particle size is 5 μm or less, an effective area contributing to an electrode reaction can be sufficiently secured. Therefore, good discharge characteristics with a large current can be obtained.

The negative electrode active material particles preferably have a specific surface area of 1 to 10 m²/g. When the specific surface area is 1 m²/g or greater, an effective area contributing to an electrode reaction is sufficient. Therefore, good discharge characteristics with a large current can be obtained. On the other hand, when the specific surface area is 10 m²/g or less, a reaction between the negative electrode active material particles and a non-aqueous electrolyte is suppressed. Therefore, decrease of a charge and discharge efficiency and gas generation during storage can be suppressed.

A negative electrode conductive agent is used, if needed, in order to improve current-collecting performance. Examples of the negative electrode conductive agent include carbon materials. The carbon materials preferably have high adsorption performance of alkali metals and high conductivity. Examples of the carbon materials include carbon black, acetylene black being a typical example, and graphite. It is preferable that a particle diameter of carbon black is 100 nm or less, and a particle diameter of graphite is 30 μm or less. The use of a smaller particle diameter enables conductivity to be applied effectively. More preferably, the particle diameter of carbon black is 50 nm or less. More preferably, the particle diameter of graphite is 10 μm or less.

A negative electrode binder is used in order to bind the negative electrode active material particles and the negative electrode current collector. Examples of the negative electrode binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The proportions of the negative electrode active material, the negative electrode conductive agent, and the negative electrode binder included in the negative electrode mixture layer are preferably 70 to 95% by weight, 0 to 25% by weight, and 2 to 10% by weight, respectively.

The negative electrode can be produced, for example, according to the following procedure. First, a negative electrode active material, a conductive agent, and a binder are mixed into an appropriate solvent, for example, N-methyl-2-pyrrolidone, to prepare a slurry. The slurry is applied onto the surface of the negative electrode current collector to form an applied coat, and the applied coat is dried. The negative electrode mixture layer having a desired density is produced by pressing the dried applied coat, and thereby the negative electrode is completed.

(2) Positive Electrode

A sheet including a material having high electrical conductivity may be used as a positive electrode current collector. For example, an aluminum foil or an aluminum alloy foil may be used as the positive electrode current collector. When the aluminum foil or the aluminum alloy foil is used, the thickness is, for example, 20 μm or less, and preferably 15 μm or less. The aluminum alloy foil may include one or more of magnesium, zinc, silicon, or the like. The amount of transition metals such as iron, copper, nickel, and chromium included in the aluminum alloy foil is preferably 1% or less.

A positive electrode active material may also include an active material other than the nickel-cobalt-manganese composite oxide represented by a composition formula $Li_{1-a}Ni_xCo_yMn_zO_2$. Examples of the positive electrode active material include a lithium-manganese composite oxide (for example, $LiMn_2O_4$ or $LiMnO_2$), a lithium-nickel composite oxide (for example, $LiNiO_2$), a lithium-cobalt composite oxide ($LiCoO_2$), a lithium-nickel-cobalt composite oxide (for example, $LiNi_{1-x}Co_xO_2$, $0<x\leq1$), a lithium-manganese-cobalt composite oxide (for example, $LiMn_xCo_{1-x}O_2$, $0<x\leq1$), lithium iron phosphate ($LiFePO_4$), and a lithium-composite phosphate compound (for example, $LiMn_xFe_{1-x}PO_4$, $0<x\leq1$).

A positive electrode conductive agent is used, if needed, in order to improve current-collecting performance. Examples of the positive electrode conductive agent include carbon black, acetylene black being a typical example, and graphite.

A positive electrode binder is used in order to bind the positive electrode active material and the positive electrode current collector. Examples of the positive electrode binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The proportions of the positive electrode active material, the positive electrode conductive agent, and the positive electrode binder included in a positive electrode mixture layer are preferably 80 to 95% by weight, 3 to 20% by weight, and 2 to 7% by weight, respectively.

The positive electrode can be produced, for example, according to the following procedure. First, a positive electrode active material, a conductive agent, and a binder re mixed into an appropriate solvent, for example, N-methyl-2-pyrrolidone (NMP), to prepare a slurry. The slurry is applied onto the surface of the positive electrode current collector to form an applied coat, and the applied coat film is dried. The positive electrode mixture layer having a desired density is produced by pressing the dried applied coat, and thereby the positive electrode is completed.

(3) Separator

The separator is made of an insulating material, and can prevent the electrical contact of the positive electrode with the negative electrode. Preferably, the separator is made of a material that allows the nonaqueous electrolyte to pass through, or has a shape that allows the nonaqueous electrolyte to pass through. Examples of the separator include a non-woven fabric made of a synthetic resin, a porous polyethylene film, a porous polypropylene film, and a cellulose based separator.

(4) Nonaqueous Electrolyte

The nonaqueous electrolyte may include, for example, a nonaqueous solvent, and an electrolyte and an additive which are dissolved in the nonaqueous solvent.

Any known nonaqueous solvents used in the nonaqueous electrolyte battery may be used as the nonaqueous solvent. First examples of nonaqueous solvent include cyclic carbonates such as ethylene carbonate (EC) and propylene carbonate (PC). Second examples of nonaqueous solvent include linear carbonates such as dimethyl carbonate, methyl ethyl carbonate, and diethyl carbonate; γ-butyrolactone; acetonitrile; methyl propionate; ethyl propionate; cyclic ethers such as tetrahydrofuran and 2-methyl tetrahydrofuran; and linear ethers such as dimethoxyethane and diethoxyethane. The second examples of solvent generally have viscosity lower than that of the first examples of solvent. The nonaqueous solvent may be a solvent obtained by mixing the first example of solvent with the second example of solvent.

The electrolyte is, for example, an alkali salt, and preferably a lithium salt. The electrolyte preferably includes at least one kind of lithium salt in which a van der Waals ion radius of an anion is 0.25 nm to 0.4 nm. Examples of the lithium salt include lithium hexafluorophosphate ($LiPF_6$), lithium hexafluoroarsenate ($LiAs_6F_6$), and lithium trifluoromethanesulfonate ($LiCF_3SO_3$). Preferably, the electrolyte is lithium hexafluorophosphate ($LiPF_6$). The concentration of the electrolyte in the nonaqueous electrolyte is preferably 0.5 to 2 mol/L.

The additive may be selected, for example, from a group which can form a coat including carbon and lithium at the above-mentioned atom abundance ratio on the surface of the negative electrode. Carbon and lithium may be a component derived from the additive or be derived from the nonaqueous electrolyte described above. Alternatively, the surface state of the negative electrode of the nonaqueous electrolyte battery according to the first embodiment can be achieved by including the additive in the nonaqueous electrolyte and performing the battery production process described in the following examples. Examples of the additive include vinylene carbonate (VC), fluoro ethylene carbonate (FEC), lithium bis oxalate borate (LiBOB), lithium tetrafluoro (oxalate)phosphate (LiFOP), and lithium difluoro(oxalate) borate (LiFOB). The concentration of the additive is preferably from 0.5% by weight to 2.5% by weight.

(5) Negative Electrode Terminal and Positive Electrode Terminal

The negative electrode terminal and the positive electrode terminal are preferably made of a material having high electrical conductivity. These terminals are preferably made of the same material as that of the current collector in order to reduce contact resistance when the terminals are connected to the current collector.

(6) Container

As the container, for example, a metal container or a laminate film container may be used. However, the container is not particularly limited.

A nonaqueous electrolyte battery having excellent impact resistance and long-term reliability can be achieved by using the metal container as the container. The use of the laminate film container as the container can achieve a nonaqueous electrolyte battery having excellent corrosion resistance, and at the same time, the weight of the nonaqueous electrolyte battery can be reduced.

A metal container having a thickness within a range of, for example, 0.2 to 5 mm may be used. The metal container more preferably has a thickness of 0.5 mm or less.

The metal container preferably includes at least one metal selected from the group consisting of Fe, Ni, Cu, Sn, and Al. The metal container may be made of, for example, aluminum, an aluminum alloy, or the like. The aluminum alloy is preferably an alloy including elements such as magnesium, zinc, and silicon. When the alloy includes transition metals such as iron, copper, nickel, and chromium, the amount of these transition metals is preferably 1% by weight or less. Thereby, the long-term reliability and the impact resistance under a high temperature environment can be dramatically improved.

A laminate film container having a thickness being within a range of, for example, 0.1 to 2 mm may be used. The thickness of the laminate film is more preferably 0.2 mm or less.

As the laminate film, a multilayer film including a metal layer and resin layers sandwiching the metal layer is used. The metal layer preferably includes at least one metal selected from the group consisting of Fe, Ni, Cu, Sn, and Al. The metal layer is preferably made of an aluminum foil or an aluminum alloy foil in order to obtain a lightweight battery. As the resin layer, a high-molecular material such as polypropylene (PP), polyethylene (PE), nylon, or polyethylene terephthalate (PET) may be used. The laminate film can be molded into the shape of the container by thermally sealing the laminate film.

Examples of the form of the container include a flat form (thin form), a rectangular form, a cylinder form, a coin form, and a button form. The container can have various sizes according to applications. For example, when the nonaqueous electrolyte battery according to the first embodiment is used in the application of a mobile electronic device, the container can be miniaturized according to the size of an electronic device to be mounted. Alternatively, a container for a nonaqueous electrolyte battery to be mounted on two-wheel or four-wheel vehicles or the like may be a container for a large-sized battery.

Next, an example of a nonaqueous electrolyte battery according to an embodiment will be described in more detail with reference to the drawings.

Figure 2:
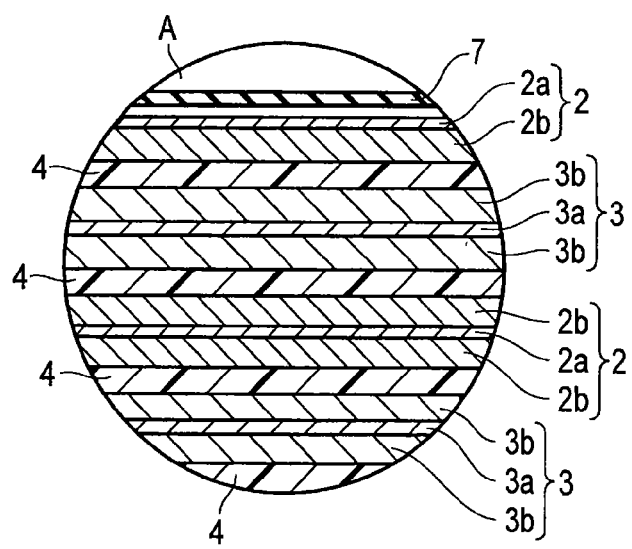
FIG. 2 is an enlarged sectional view of part A of FIG. 1.

FIG. 1 is a partially cutout perspective view of a nonaqueous electrolyte battery of a first example according to the embodiment. FIG. 2 is an enlarged sectional view of part A of the nonaqueous electrolyte battery shown in FIG. 1.

A nonaqueous electrolyte battery 100 shown in FIGS. 1 and 2 includes a flat electrode group 1.

The flat electrode group 1 includes a negative electrode 2, a positive electrode 3, and a separator 4.

The negative electrode 2 includes a negative electrode current collector 2a and a negative electrode mixture layer 2b supported on the negative electrode current collector 2a, as shown in FIG. 2. The positive electrode 3 includes a positive electrode current collector 3a and a positive electrode mixture layer 3b supported on the positive electrode current collector 3a, as shown in FIG. 2.

In the electrode group 1, as shown in FIG. 2, the negative electrode 2 and the positive electrode 3 are stacked in a state where the separator 4 is sandwiched between the negative electrode mixture layer 2b and the positive electrode mixture layer 3b. The electrode group 1, as such, can be obtained according to the following procedure. First, a plate-like negative electrode 2 and a plate-like positive electrode 3 are laminated together with a separator 4 interposed in between. Next, another separator 4 is stacked onto a positive electrode mixture layer 3b which is not opposed to the negative electrode 2, to produce a laminate. The laminate is wound with the negative electrode 2 on the outside. Then, a winding core is extracted, and the laminate is then pressed into a flat shape. Thus, the electrode group 1 shown in FIGS. 1 and 2 can be obtained.

A belt-like negative electrode terminal 5 is electrically connected to the negative electrode 2. A belt-like positive electrode terminal 6 is electrically connected to the positive electrode 3.

The nonaqueous electrolyte battery 100 shown in FIGS. 1 and 2 further includes a pouch 7 made of a laminate film, as the container.

The electrode group 1 is housed in the pouch 7 made of a laminate film with one end of each of the negative electrode terminal 5 and the positive electrode terminal 6 extending out from the pouch 7. A nonaqueous electrolyte, which is not shown, is housed in the pouch 7 made of a laminate film. The electrode group 1 is impregnated with the nonaqueous electrolyte. The circumference of the pouch 7 is heat-sealed. In this manner, the electrode group 1 and the nonaqueous electrolyte are sealed.

Next, a second example of a nonaqueous electrolyte battery according to a first embodiment will be described in detail with reference to FIG. 3.

Figure 3:
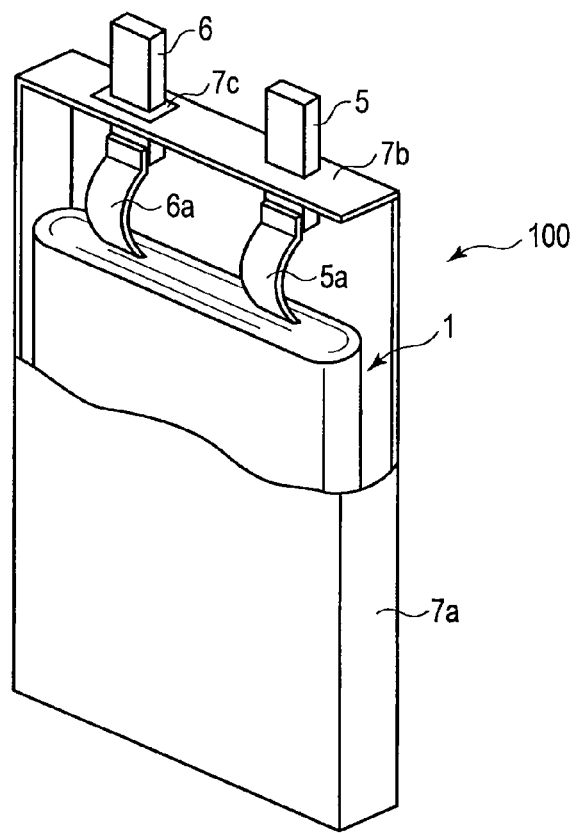
FIG. 3 is a partially cutout perspective view of a nonaqueous electrolyte battery of a second example according to the first embodiment.

FIG. 3 is a partially cutout perspective view of the nonaqueous electrolyte battery of the second example according to the first embodiment.

A nonaqueous electrolyte battery 100 shown in FIG. 3 is largely different from the nonaqueous electrolyte battery 100 of the first example in that a container is configured from a metal container 7a and a sealing plate 7b.

The nonaqueous electrolyte battery 100 shown in FIG. 3 includes the same electrode group 1 as the electrode group 1 of the nonaqueous electrolyte battery 100 of the first example. The difference between the first example and the second example lies in a point in that the second example shown in FIG. 3 uses a member 5a, which is used as the negative electrode terminal 5 in the first example, as a negative electrode tab, and a point in that the second example uses a member 6a, which is used as the positive electrode terminal 6 in the first example, as a positive electrode tab.

In the nonaqueous electrolyte battery 100 shown in FIG. 3, the electrode group 1 is housed in the metal container 7a. The metal container 7a further houses a nonaqueous electrolyte. The metal container 7a is sealed by a metal sealing plate 7b.

The sealing plate 7b includes a negative electrode terminal 5 and a positive electrode terminal 6. An insulating member 7c is interposed between the positive electrode terminal 6 and the sealing plate 7b. Thereby, the positive electrode terminal 6 and the sealing plate 7b are electrically insulated from each other.

The negative electrode terminal 5 is connected to the negative electrode tab 5a as shown in FIG. 3. Similarly, the positive electrode terminal 6 is connected to the positive electrode tab 6a.

(Method for Observing Surface State of Negative Electrode Included in Nonaqueous Electrolyte Battery Using Photoelectron Spectroscopy)

Next, a method for observing the surface state of the negative electrode included in the nonaqueous electrolyte battery using photoelectron spectroscopy will be described.

1. Sampling

First, a nonaqueous electrolyte battery which is a subject of measurement is prepared. The prepared nonaqueous electrolyte battery is discharged until the negative electrode potential reaches 1.6 V (vs. Li/Li$^+$) or more. Then, the discharged nonaqueous electrolyte battery is disassembled in an inert atmosphere such as argon. An electrode group is taken out from the dismantled nonaqueous electrolyte battery. At this time, care should be taken to avoid electrical contact between a positive electrode and a negative electrode. The electrode group is taken out in a state where a repeated structure of a positive electrode, a separator, a negative electrode, a separator, and a positive electrode, as shown in FIG. 2, is maintained. The electrode group, thus taken out, is separated into the separator, the positive electrode, and the negative electrode, for example, by using tweezers or the like. The negative electrode thus obtained is immersed in an organic solvent such as ethyl methyl carbonate to wash the negative electrode. The washed negative electrode is dried.

Next, an electrode fragment having a size of about a square with 5 mm sides is cut out from the dried positive electrode using a cutter. This is used as a sample.

2. Measurement

The electrode fragment prepared above as the sample is set on a measurement stage. Then, the measurement stage on which the electrode piece is set is introduced into a photoelectron spectroscopy device (VG Theta Probe manufactured by Thermo Fisher Scientific), and the interior of the device is brought to a vacuum state. In the device, measurement is performed with an X-ray spot diameter set to 800×400 μm and using AlKα rays as excitation X-rays. The region of measurement is a region much larger than a particle diameter of the above-mentioned negative electrode active material and conductive agent. In addition, the distance that photoelectrons for irradiation can travel through substance without undergoing inelastic scattering is few nm. Consequently, the detection depth in this procedure is few nm, therefore an extremely close vicinity of the negative electrode surface is assumed to be measured. From the above reasons, an average state of a portion of depth of few nm from the negative electrode surface is considered to be measured in this procedure. Thus, the photoelectron spectrum of the sample is obtained.

3. Analysis

From the obtained photoelectron spectrum, an Li-atom abundance ratio $A_{Li}$ is calculated from an area of a peak attributed to a 1 s orbit of Li, which appears in a binding energy region of 50 eV to 60 eV. Further, the C-atom abundance ratio $A_C$ is calculated from an area of a peak attributed to a 1 s orbit of C, which appears in a binding energy region of 280 eV to 295 eV. Further, the Ti-atom abundance ratio $A_{Ti}$ is calculated from an area of a peak attributed to a 2p orbit of Ti, which appears in a binding energy region 452 eV to 462 eV. The ratio $A_C/A_{Ti}$ between the C-atom abundance ratio $A_C$ and the Ti-atom abundance ratio $A_{Ti}$ as well as the ratio $A_{Li}/A_C$ between the Li-atom abundance ratio $A_{Li}$ and the C-atom abundance ratio $A_C$ are calculated from the atom abundances ratios thus obtained. Each of the atom abundance ratios are calculated as follows. First, boron (B), carbon (C), oxygen (O), lithium (Li), nitrogen (N), fluorine (F), phosphorus (P), sulfur (S), titanium (Ti), manganese (Mn), cobalt (Co), and nickel (Ni) are set as constituent elements as a parameter. Then, the atom abundance ratio of each element is calculated by using an average matrix relative sensitivity factor method described in ISO18118. The inner core spectrum of each element used for the calculation is defined as follows. The inner core spectrum of B is defined as a $B1_s$ peak appearing in a binding energy region of 185 eV to 200 eV. The inner core spectrum of C is defined as a $C1_s$ peak appearing in a binding energy region of 280 eV to 295 eV. The inner core spectrum of O is defined as an $O1_s$ peak appearing in a binding energy region of 520 eV to 545 eV. The inner core spectrum of Li is defined as a $Li1_s$ peak appearing in a binding energy region of 50 eV to 60 eV. The inner core spectrum of N is defined as a $N1_s$, peak appearing in a binding energy region of 390 eV to 410 eV. The inner core spectrum of F is defined as a $F1_s$ peak appearing in a binding energy region of 675 eV to 695 eV. The inner core spectrum of P is defined as a P2p peak appearing in a binding energy region of 125 eV to 145 eV. The inner core spectrum of S is defined as a S2p peak appearing in a binding energy region of 165 eV to 175 eV. The inner core spectrum of Ti is defined as a Ti2p peak appearing in a binding energy region of 452 eV to 462 eV. The inner core spectrum of Mn is defined as a Mn2p peak appearing in a binding energy region of 630 eV to 660 eV. The inner core spectrum of Co is defined as a Co2p peak appearing in a binding energy region of 780 eV to 810 eV. The inner core spectrum of Ni is defined as a Ni3p peak appearing in a binding energy region of 64 eV to 72 eV.

Figure 4:
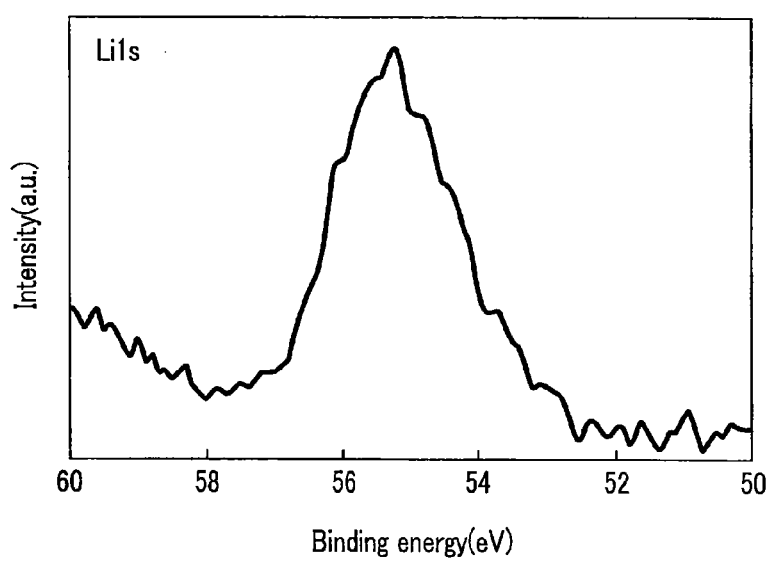
FIG. 4 shows a part of a photoelectron spectrum of the surface of a negative electrode included in a nonaqueous electrolyte battery of an example according to the first embodiment.
Figure 5:
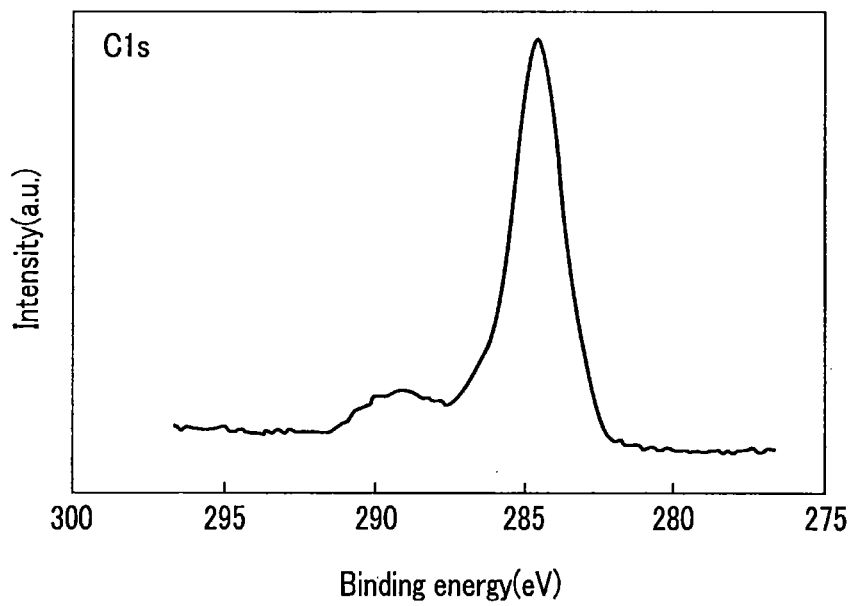
FIG. 5 shows another part of the photoelectron spectrum of the surface of the negative electrode included in the nonaqueous electrolyte battery of the example according to the first embodiment.
Figure 6:
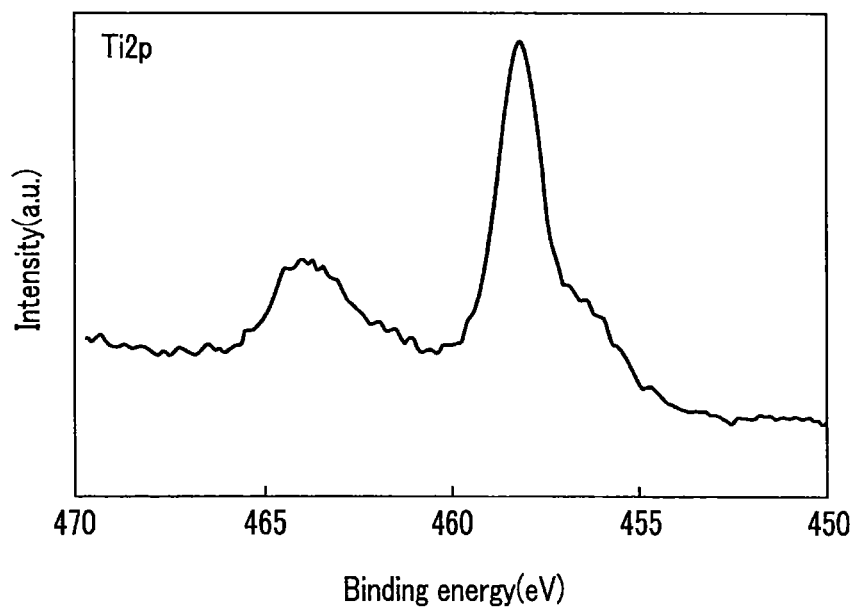
FIG. 6 shows still another part of the photoelectron spectrum of the surface of the negative electrode included in the nonaqueous electrolyte battery of the example according to the first embodiment.

Photoelectron spectra as an example for a surface of a negative electrode included in a nonaqueous electrolyte battery of an example according to an embodiment is shown in FIGS. 4 to 6. In the photoelectron spectrum shown in FIG. 4, a peak appearing in a binding energy region of 52 eV to 58 eV is a peak attributed to a 1 s orbit of Li. In the photoelectron spectrum shown in FIG. 5, a plurality of peaks appearing in a binding energy region of 280 eV to 295 eV are peaks attributed to different bonding states of a 1 s orbit of C. In the photoelectron spectrum shown in FIG. 6, a peak appearing in a binding energy region of 452 eV to 462 eV is a peak attributed to a 2p orbit of Ti.

The ratio $A_C/A_{Ti}$ and the ratio $A_{Li}/A_C$ of each sample are calculated from the Li-atom abundance ratio $A_{Li}$, Ti-atom abundance ratio $A_{Ti}$, and C-atom abundance ratio $A_C$, thus obtained.

<Method for Measuring Ratio p/n>

The capacity ratio p/n of the positive electrode capacity p to the negative electrode capacity n in the nonaqueous electrolyte battery can be calculated from the capacity per unit area of the current collector for the mixture layer supported on one surface of each electrode.

1. Sampling

First, a nonaqueous electrolyte battery which is a subject for measurement is prepared. The prepared nonaqueous electrolyte battery is discharged until a battery voltage is 1.5 V (vs. $Li/Li^+$) or less. Then, the discharged nonaqueous electrolyte battery is dismantled under an inert atmosphere such as argon. An electrode group is taken out from the dismantled nonaqueous electrolyte battery. At this time, care should be taken to avoid electrical contact between a positive electrode and a negative electrode. The electrode group is taken out in a state where a repeated structure of a positive electrode, a separator, a negative electrode, a separator, and a positive electrode, as shown in FIG. 2, is maintained. The electrode group, thus taken out, is separated into the separator, the positive electrode, and the negative electrode by using, for example, insulated tweezers made of ceramics, or the like. The positive electrode and negative electrode thus obtained are each immersed in an organic solvent such as ethyl methyl carbonate to wash the positive electrode and the negative electrode. The washed positive electrode and negative electrode are dried.

Next, when each electrode mixture layer is supported on each surface of the current collecting foil, the mixture layer is dissolved by using a solvent such as N-methyl-2-pyrrolidone, to remove the mixture layer supported on one surface.

Next, an electrode fragment having a size of about a square with 2 cm sides is cut out from the positive electrode and the negative electrode using a cutter, scissors, or a photograph cutter. These are used as a positive electrode sample and a negative electrode sample.

2. Charge and Discharge Test

Next, a three electrode battery is produced using the positive electrode sample produced above as a working electrode, and using metal lithium as a counter electrode and a reference electrode. Similarly, another three electrode battery is produced using the negative electrode sample produced above as a working electrode. These three electrode type batteries are subjected to a charge and discharge test according to the following procedure.

First, the three electrode battery is charged. Charging conditions are as follows. A current density is set to 0.3 mA/cm$^2$. For the three electrode battery of the positive electrode, a charge voltage is set to 4.2 V. For the three electrode battery of the negative electrode, a charge voltage is set to 1.3 V. The charging is performed under a 25° C. environment for 10 hours.

The three electrode battery is put to rest for 10 minutes after charging. Subsequently, the three electrode battery is discharged. Discharge conditions are as follows. A current density is set to 0.3 mA/cm$^2$. In the three electrode battery of the positive electrode, a final voltage after discharge is set to 3.0 V. In the three electrode battery of the negative electrode, a final voltage after discharge is set to 1.8 V. The discharge is performed under a 25° C. environment, with a current maintained constant. A discharge capacity during the discharge is measured, and the obtained discharge capacity is defined as an amount of current which can be discharged in 1 hour, i.e., 1 C.

Next, the three electrode battery is recharged. Charging conditions are as follows. A current rate is set to 0.2 C. In the three electrode battery of the positive electrode, a charge voltage is set to 4.2 V. In the three-electrode battery of the negative electrode, a charge voltage is set to 1.3 V. The charging is performed under a 25° C. environment until a current rate becomes 0.05 C.

The three electrode battery is put to rest for 10 minutes after charging. Subsequently, the three electrode battery is discharged. Discharge conditions are as follows. A current rate is set to 0.2 C. In the three electrode battery of the positive electrode, a final voltage after discharge is set to 3.0 V. In the three electrode battery of the negative electrode, a final voltage after discharge is set to 1.8 V. The discharge is performed under a 25° C. environment with the current maintained constant. A discharge amount in this case is measured as a discharge capacity at 0.2 C.

The discharge capacities at 0.2 C for the obtained positive electrode and negative electrode are respectively defined as p and n. A capacity ratio p/n can be calculated using p and n, thus obtained.

In the nonaqueous electrolyte battery according to the first embodiment, the negative electrode includes an oxide of titanium and has a surface state in which the ratio $A_C/A_B$ is from 2 to 10 and the ratio $A_{Li}/A_C$ is from 1.0 to 1.5. In the nickel-cobalt-manganese composite oxide $Li_{1-a}Ni_xCo_yMn_zO_2$ included in the positive electrode, the subscripts x, y, and z satisfy the inequality $0.1 \leq x(y+z) \leq 1.3$. Further, the ratio p/n of the positive electrode capacity to the negative electrode capacity is from 1.2 to 2.0. Therefore, even in an overcharged state, the nonaqueous electrolyte battery can both suppress heat generation caused by aside reaction on the surface of the negative electrode active material and suppress rapid generation of heat from the positive electrode. As a result, the nonaqueous electrolyte battery according to the first embodiment can exhibit improved safety.

Second Embodiment

According to a second embodiment, a battery pack is provided. The battery pack includes the nonaqueous electrolyte battery according to the first embodiment.

The battery pack according to the second embodiment may include a plurality of nonaqueous electrolyte batteries. The plurality of nonaqueous electrolyte batteries may be electrically connected in series, or may be electrically connected in parallel. Alternatively, the plurality of nonaqueous electrolyte batteries may also be connected in a combination of a connection in series and a connection in parallel.

For example, the battery pack according to the second embodiment may include six of the nonaqueous electrolyte batteries of the first embodiment. These nonaqueous electrolyte batteries may be connected in series. The nonaqueous electrolyte batteries connected in series can constitute a battery module. That is, the battery pack according to the second embodiment may include a battery module.

The battery pack according to the second embodiment may include a plurality of battery modules. The plurality of battery modules may be connected in series, in parallel, or in a combination of a connection in series and a connection in parallel.

Hereinafter, an example of the battery pack according to the second embodiment will be described with reference to FIGS. 7 and 8.

Figure 7:
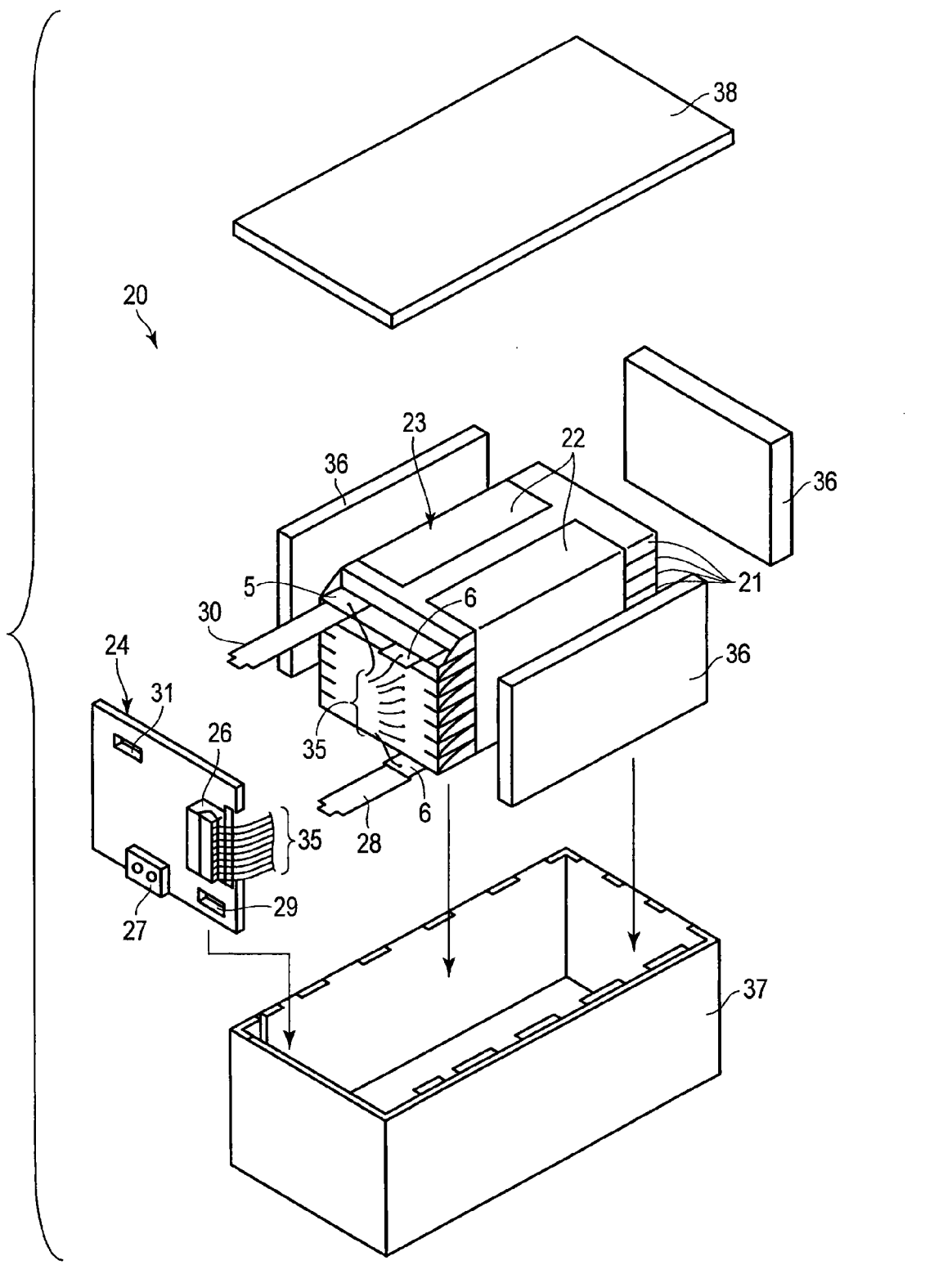
FIG. 7 is an exploded perspective view of a battery pack of an example according to a second embodiment.

FIG. 7 is an exploded perspective view of a battery pack of an example according to the second embodiment. FIG. 8 is a block diagram showing an electric circuit of the battery pack of FIG. 7.

Figure 8:
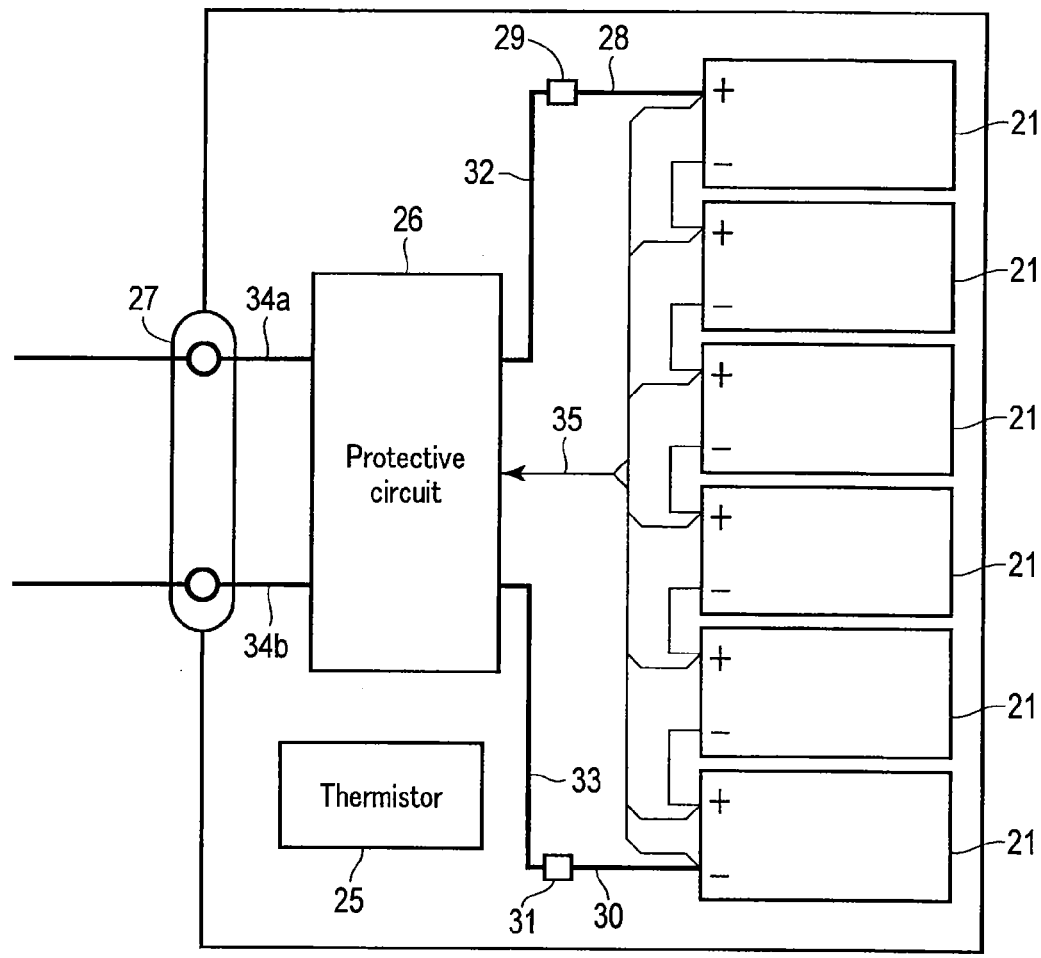
FIG. 8 is a block diagram showing an electric circuit of the battery pack shown in FIG. 7.

A battery pack 20 shown in FIGS. 7 and 8 includes a plurality of unit cells 21. The unit cell 21 is the flat nonaqueous electrolyte battery 100 of an example according to the first embodiment described with reference to FIG. 3.

The plurality of unit cells 21 are stacked so that a negative electrode terminal 5 and a positive electrode terminal 6, which extend out of the container, are aligned in the same direction, and the unit cells 21 are bound by an adhesive tape 22 to constitute a battery module 23. As shown in FIG. 8, the unit cells 21 are electrically connected in series with one another.

A printed wiring board 24 is arranged opposite to the side surface of the unit cell 21 from which the negative electrode terminal 5 and the positive electrode terminal 6 extend. As shown in FIG. 8, a thermistor 25, a protective circuit 26, and a conducting terminal 27 that conducts electricity to external devices are mounted on the printed wiring board 24. An insulating plate (not shown) is attached to the surface of the printed wiring board 24 facing the battery module 23 to avoid unnecessary connection with the wiring of the battery module 23.

A positive electrode lead 28 is connected to the positive electrode terminal 6 positioned on the lowermost layer of the battery module 23, and one end of the positive electrode lead 28 is inserted into and electrically connected to a positive electrode connector 29 of the printed wiring board 24. A negative electrode lead 30 is connected to the negative electrode terminal 5 positioned on the uppermost layer of the battery module 23, and one end of the negative electrode lead 30 is inserted into and electrically connected to a negative electrode connector 31 of the printed wiring board 24. These connectors 29 and 31 are connected to the protective circuit 26 through wirings 32 and 33 formed on the printed wiring board 24.

The thermistor 25 is used to detect a temperature of the unit cell 21, and detection signals are transmitted to the protective circuit 26. The protective circuit 26 can shut off a positive-side wiring 34a and a negative-side wiring 34b between the protective circuit 26 and the conductive terminal 27, under a predetermined condition. An example of a predetermined condition is when the temperature detected by the thermistor 25 is a predetermined temperature or higher, for example. Also, another example of a predetermined condition is when an over-charge, over-discharge, over-current, or the like of the unit cell 21 is detected, for example. The detecting of the over-charge or the like is performed for individual unit cells 21 or the entire battery module 23 as a whole. When detecting is performed for individual unit cells 21, detecting may be performed with regards to a battery voltage, or detecting may be performed with regards to a positive electrode potential or a negative electrode potential. In the latter case, a lithium electrode is inserted in each individual unit cell 21 as a reference electrode. In the case of the battery pack 20 in FIGS. 7 and 8, a wiring 35 for detecting voltage is connected to each unit cell 21. Detection signals are transmitted to the protective circuit 26 through these wirings 35.

A protective sheet 36 made of rubber or resin is arranged on each of the three side surfaces of the battery module 23 excluding the side surface from which the positive electrode terminal 6 and the negative electrode terminal 5 project.

The battery module 23 is housed in a housing container 37 together with each of the protective sheets 36 and printed wiring board 24. More specifically, each of the protective sheets 36 are arranged on both inside surfaces along a long-side direction and on one of the inside surfaces along a short-side direction of the housing container 37, and the printed wiring board 24 is arranged on an inside surface opposite to the protective sheet 36 that is arranged along the short-side direction. The battery module 23 is positioned in a space enclosed by the protective sheets 36 and the printed wiring board 24. A cover 38 is mounted on an upper side of the housing container 37.

A heat-shrinkage tape may be used in place of the adhesive tape 22 to secure the battery module 23. In this case, after the protective sheet is arranged on both sides of the battery module and the heat-shrinkage tape is wound around the battery module and protective sheets, the heat-shrinkage tape is contracted by heating to fasten the battery module together.

A configuration in which the unit cells 21 are connected in series is shown in FIGS. 7 and 8. However, these unit cells may be connected in parallel to increase the capacity of the battery. The assembled battery packs may be connected in series, in parallel, or both in series and in parallel, also.

Embodiments of the battery pack according to the second embodiment are appropriately changed depending on applications. Preferable applications of the battery pack according to the second embodiment are those in which favorable cycle characteristics at large current are desired. Specific examples of the applications include power sources for digital cameras, and power sources mounted on vehicles such as two to four-wheeled hybrid electric cars, two to four-wheeled electric cars, and assist bicycles. The battery pack according to the second embodiment is particularly preferably used for power sources mounted on vehicles.

Since the battery pack according to the second embodiment includes the nonaqueous electrolyte battery according to the first embodiment, the battery pack is excellent in safety.

EXAMPLES

Hereinafter, the present invention will be described in more detail with reference to examples. However, the present invention is not limited to the following examples so long as the present invention does not depart from the spirit of the present invention.

Example 1

In Example 1, a nonaqueous electrolyte battery of Example 1 was produced by the following procedure.

<Production of Positive Electrode>

91% by weight of lithium-nickel-cobalt manganese oxide ($LiNi_{0.5}Co_{0.3}Mn_{0.2}O_2$) powder as a positive electrode active material, 2.5% by weight of acetylene black, 3% by weight of graphite, and 3.5% by weight of polyvinylidene fluoride (PVdF) were mixed with N-methyl-2-pyrrolidone (NMP) to prepare a slurry. The slurry was applied onto both surfaces of a current collector made of an aluminum foil having a thickness of 15 μm to form an applied coat. The applied coat was dried, then pressed. Thus, a positive electrode having a positive electrode mixture layer with a density of 3.0 g/cm³ was produced.

<Production of Negative Electrode>

A spinel type lithium titanate powder as a negative electrode active material, graphite, acetylene black, and PVdF were added to NMP and mixed to prepare a slurry. Here, the blending ratio of spinel type lithium titanate powder:graphite:acetylene black:PVdF was 85% by weight: 5% by weight:3% by weight:7% by weight.

Subsequently, the slurry was applied onto both surfaces of a current collector made of an aluminum foil having a thickness of 11 μm to form an applied coat. The applied coat was dried, then pressed. Thus, a negative electrode having a negative electrode mixture layer with a density of 2.0 g/cm³ was produced.

Subsequently, a mixed gas of carbon dioxide and nitrogen with a carbon dioxide concentration of about 5% was blown onto the negative electrode surface under an environment where a dew point was −15° C., to allow carbon dioxide to be absorbed onto the negative electrode surface. This process facilitates the formation of a layer of Li-including compounds such as $Li_2CO_3$ or $LiHCO_3$ on the surface.

<Production of Electrode Group>

The positive electrode produced above, a separator made of a polyethylene porous film having a thickness of 20 μm, the negative electrode produced above, and another separator were laminated in this order, to obtain a laminate. The obtained laminate was then spirally wound so that the negative electrode would be positioned on the outermost periphery to produce an electrode group. This was heat-pressed at 90° C. to produce a flat-shaped electrode group having a width of 58 mm, a height of 95 mm, and a thickness of 3.0 mm.

The obtained electrode group was housed in a pouch. The pouch was made of a laminate film including an aluminum foil having a thickness of 40 μm and a polypropylene layer formed on each surface of the aluminum foil. The laminate film had a thickness of 0.1 mm. The circumference of the pouch was heat-sealed aside from a portion left unsealed as an opening. Then, an interior of the pouch was dried under vacuum at 80° C. for 24 hours.

<Preparation of Nonaqueous Electrolyte Solution>

A mixed solvent was prepared by mixing ethylene carbonate (EC) and methylethyl carbonate (MEC) at a volume ratio of 1:2. A nonaqueous electrolyte solution was prepared by dissolving 1.0 mol/L of lithium hexafluorophosphate ($LiPF_6$) into the mixed solvent and dissolving 1.0% by mass of an additive LiBOB into the mixed solvent.

<Production of Battery Unit>

The nonaqueous electrolytic solution was injected into the above pouch housing the electrode group via the opening left unsealed. Then, the opening was heat-sealed to seal the pouch, and thereby a battery unit having a structure as shown in FIGS. 1 and 2 was produced. Two battery units were produced using the same manufacturing condition.

<Adjustment to Initial State>

Subsequently, these battery units were subjected to initial charging. The initial charging was performed under a 0° C. environment at a current rate of 0.2 C until the cell voltage reached 3.0 V.

Then, the battery units were discharged. The discharge was performed under a 25° C. environment at a 0.2 C rate until the cell voltage reached 1.5 V. After that, the battery units were recharged. This recharge was performed under a 25° C. environment at a 0.2 C rate until the cell voltage reached 2.8 V. Thereafter, these battery units were stored at a temperature environment of 60° C. for 24 hours to perform an aging of the battery units. Thereafter, the charge state of each of the battery units was adjusted. Here, the battery units were first discharged at a 0.2 C rate at an environmental temperature of 25° C. until the cell voltage reached 1.5 V. Then, the battery units were charged to a state of charge of 50%. Thus, the nonaqueous electrolyte battery of Example 1, adjusted to an initial state, was obtained.

<Measurement of Capacity Ratio p/n of Positive Electrode Capacity p and Negative Electrode Capacity n>

The capacity ratio p/n was measured according to the procedure described above. The ratio p/n of Example 1 was 1.4.

<Measurement of Atom Abundance Ratio of C, Li, and Ti on Surface of Negative Electrode>

The surface state of the negative electrode was observed by photoelectron spectroscopy according to the above-described procedure.

Part of a photoelectron spectrum obtained for the surface of the negative electrode of the nonaqueous electrolyte battery in an initial state is shown in each of FIGS. 4 to 6. A peak appearing in a binding energy region of 52 eV to 58 eV shown in FIG. 4 is a peak derived from a 1 s orbit of Li. A peak appearing in a binding energy region of 280 eV to 295 eV shown in FIG. 5 is a peak derived from a 1 s orbit of C. On the other hand, a peak appearing in a binding energy region of 452 eV to 462 eV shown in FIG. 6 is a peak derived from a 2p orbit of Ti.

According to the procedure described above, a ratio $A_C/A_{Ti}$ and a ratio $A_{Li}/A_C$ were calculated from the results obtained by photoelectron spectroscopy. In Example 1, the ratio $A_C/A_{Ti}$ was 2.72 and the ratio $A_{Li}/A_C$ was 1.45.

This result showed that a surface state including C and Li was formed on the surface of the negative electrode active material particles included in the negative electrode.

As described above, in Example 1, the additive in the electrolyte solution was reductively decomposed on the negative electrode surface to form a protective layer. By having the formation of the protective layer proceed at a temperature that is lower than room temperature, segregation of the protective layer and formation of an excessively thick protective layer can be prevented. As a result, a uniform protective layer can be formed. In Example 1, it is found that the above-described initial charging at low temperatures and aging facilitated the reaction of the additive on the negative electrode surface, and thus a stable surface state including C and Li was formed.

Comparative Example 1

A nonaqueous electrolyte battery of Comparative Example 1 was produced in the same manner as in Example 1 except that no additive was included in the nonaqueous electrolyte in Comparative Example 1.

For the nonaqueous electrolyte battery of Comparative Example 1, adjustment to an initial state, measurement of the capacity ratio (p/n) between the positive electrode and the negative electrode, and measurement of the atom abundance ratios of C, Li, and Ti on the surface of the negative electrode were performed in the same manner as in Example 1. The results are shown in the following Table 2.

<Over-Charge Test>

One of the nonaqueous electrolyte batteries of Example 1 and one of the nonaqueous electrolyte batteries of Comparative Example 1 were charged under a 25° C. environment at a 1 C rate until the state of charge reached 100%. Thereafter, each of the nonaqueous electrolyte batteries was subjected to an over-charge test at a 1 C rate. When the SOC at the point at which rapid generation of heat occurred in Comparative Example 1 was set as the standard (=1), the SOC at the point at which rapid generation of heat occurred in Example 1 was 1.12.

Examples 2 to 4

In Examples 2 to 4, nonaqueous electrolyte batteries of Examples 2 to 4 were produced in the same manner as in Example 1 except that the nonaqueous electrolytes were prepared with a proportion by weight of the additive (Li-BOB) included in the nonaqueous electrolytes having been changed in a range of 1% by weight to 2.5% by weight as shown in the following Table 1.

Examples 5 to 8

In Examples 5 to 8, nonaqueous electrolyte batteries of Examples 5 to 8 were produced in the same manner as in Example 1 except that the values of x/(y+z) in the composition of the nickel-cobalt-manganese composite oxide included in the positive electrode were changed in a range of 0.1 to 1.3 as shown in the following Table 1, and the additives included in the nonaqueous electrolyte were changed.

Examples 9 to 11

In Examples 9 to 11, nonaqueous electrolyte batteries of Examples 9 to 11 were produced in the same manner as in Example 1 except that Ramsdellite-type lithium titanate powder ($Li_2Ti_3O_7$:LTO(R)), monoclinic titanium dioxide ($TiO_2$(B):$TiO_2$), monoclinic niobium titanium composite oxide ($NbTi_2O_7$:NTO) were used as negative electrode active materials as shown in the following Table 1.

Example 12

In Example 12, a nonaqueous electrolyte battery of Example 12 was produced in the same manner as in Example 1 except that the initial charging of the battery unit was performed at 25° C. at a current rate of 0.2 C until the cell voltage reached 3.0 V.

Example 13

In Example 13, a nonaqueous electrolyte battery of Example 13 was produced in the same manner as in Example 1 except that no additive was included in the nonaqueous electrolyte and the initial charging of the battery unit was performed under a −10° C. environment at a current rate of 0.2 C until the cell voltage reached 3.5 V.

Comparative Example 2

In Comparative Example 2, a nonaqueous electrolyte battery of Comparative Example 2 was produced in the same manner as in Example 1 except that an oxide $LiNi_{0.8}Co_{0.2}Mn_{0.2}O_2$ in which the value of x/(y+z) was 2.0 was used as the nickel-cobalt-manganese composite oxide included in the positive electrode and no additive was included in the nonaqueous electrolyte.

Comparative Example 3

In Comparative Example 3, a nonaqueous electrolyte battery of Comparative Example 3 was produced in the same manner as in Example 1 except that an oxide $LiNi_{0.05}Co_{0.5}Mn_{0.45}O_2$ in which the value of x/(y+z) was 0.05 was used as the nickel-cobalt-manganese composite oxide included in the positive electrode and no additive was included in the nonaqueous electrolyte.

Comparative Example 4

In Comparative Example 4, a nonaqueous electrolyte battery of Comparative Example 4 was produced in the same manner as in Example 1 except that the proportion by weight of the additive (LiBOB) included in the nonaqueous electrolyte was adjusted to 2.7% by weight.

Comparative Examples 5 to 6

In Comparative Examples 5 to 6, nonaqueous electrolyte batteries of Comparative Examples 5 to 6 were produced in the same manner as in Comparative Example 2 except that the additive (LiBOB) was included in the electrolyte solution at proportions by weight shown in the following Table 3.

Comparative Example 7

In Comparative Example 7, a nonaqueous electrolyte battery of Comparative Example 7 was produced in the same manner as in Example 1 except that the initial charging of the battery unit was performed under a 45° C. environment at a current rate of 0.2 C until the cell voltage reached 3.0 V.

For the nonaqueous electrolyte batteries of Examples 2 to 13 and Comparative Examples 2 to 7, measurement of the capacity ratio (p/n) between the positive electrode and the negative electrode, and measurement of the atom abundance ratio of C, Li, and Ti on the surface of the negative electrode, and over-charge test were performed in the same manner as in Example 1. The results are shown in Tables 2 and 4 below.

TABLE 1

| | Composition of Positive Electrode Active Material $LiNi_xCo_yMn_zO_2$ | | | | | | | |
|---|---|---|---|---|---|---|---|---|
| | x | y | z | x/(y + x) | relation between y and z: y − z | Additive | Additive Concentration (weight %) | Negative Electrode Active Material |
| Example 1 | 0.50 | 0.30 | 0.20 | 1.00 | 0.10 | LiBOB | 1.00 | LTO(S) |
| Example 2 | 0.50 | 0.30 | 0.20 | 1.00 | 0.10 | LiBOB | 1.30 | LTO(S) |
| Example 3 | 0.50 | 0.30 | 0.20 | 1.00 | 0.10 | LiBOB | 1.70 | LTO(S) |
| Example 4 | 0.50 | 0.30 | 0.20 | 1.00 | 0.10 | LiBOB | 2.30 | LTO(S) |
| Example 5 | 0.20 | 0.60 | 0.20 | 0.25 | 0.40 | LiFOB | 1.00 | LTO(S) |
| Example 6 | 0.55 | 0.25 | 0.20 | 1.22 | 0.05 | LiFOP | 1.00 | LTO(S) |
| Example 7 | 0.50 | 0.20 | 0.30 | 1.00 | −0.10 | VC | 1.00 | LTO(S) |
| Example 8 | 0.45 | 0.30 | 0.25 | 0.82 | 0.05 | FEC | 1.00 | LTO(S) |
| Example 9 | 0.50 | 0.30 | 0.20 | 1.00 | 0.10 | LiBOB | 1.00 | LTO(R) |
| Example 10 | 0.50 | 0.30 | 0.20 | 1.00 | 0.10 | LiBOB | 1.00 | $TiO_2$ |
| Example 11 | 0.50 | 0.30 | 0.20 | 1.00 | 0.10 | LiBOB | 1.00 | NTO |
| Comparative Example 1 | 0.50 | 0.30 | 0.20 | 1.00 | 0.10 | — | 0.00 | LTO(S) |
| Comparative Example 2 | 0.80 | 0.20 | 0.20 | 2.00 | 0.00 | — | 0.00 | LTO(S) |
| Comparative Example 3 | 0.05 | 0.50 | 0.45 | 0.05 | 0.05 | — | 0.00 | LTO(S) |
| Comparative Example 4 | 0.50 | 0.30 | 0.20 | 1.00 | 0.10 | LiBOB | 2.70 | LTO(S) |

TABLE 2

| | $A_C/A_{Ti}$ | $A_{Li}/A_C$ | p/n | Relative value of SOC at which rapid heat generation occurred | Conditions of Initial Charging Cell Voltage (V) | Temperature (° C.) | Conditions of Aging Cell Voltage (V) | Temperature (° C.) | Time (Hr) |
|---|---|---|---|---|---|---|---|---|---|
| Example 1 | 2.72 | 1.45 | 1.40 | 1.12 | 3.0 | 0° C. | 2.8 | 60 | 24 |
| Example 2 | 3.67 | 1.30 | 1.40 | 1.16 | 3.0 | 0° C. | 2.8 | 60 | 24 |
| Example 3 | 5.47 | 1.10 | 1.40 | 1.19 | 3.0 | 0° C. | 2.8 | 60 | 24 |
| Example 4 | 9.97 | 1.01 | 1.40 | 1.12 | 3.0 | 0° C. | 2.8 | 60 | 24 |
| Example 5 | 2.23 | 1.55 | 1.20 | 1.10 | 3.0 | 0° C. | 2.8 | 60 | 24 |
| Example 6 | 2.66 | 1.46 | 1.80 | 1.11 | 3.0 | 0° C. | 2.8 | 60 | 24 |
| Example 7 | 2.69 | 1.46 | 1.40 | 1.10 | 3.0 | 0° C. | 2.8 | 60 | 24 |
| Example 8 | 2.72 | 1.45 | 1.40 | 1.12 | 3.0 | 0° C. | 2.8 | 60 | 24 |
| Example 9 | 2.45 | 1.45 | 1.40 | 1.11 | 3.0 | 0° C. | 2.8 | 60 | 24 |
| Example 10 | 2.31 | 1.45 | 1.40 | 1.11 | 3.0 | 0° C. | 2.8 | 60 | 24 |
| Example 11 | 2.17 | 1.45 | 1.40 | 1.11 | 3.0 | 0° C. | 2.8 | 60 | 24 |
| Comparative Example 1 | 1.00 | 1.95 | 1.40 | 1.00 (standard) | 3.0 | 0° C. | 2.8 | 60 | 24 |
| Comparative Example 2 | 0.67 | 1.95 | 2.00 | 0.98 | 3.0 | 0° C. | 2.8 | 60 | 24 |
| Comparative Example 3 | 1.67 | 1.95 | 1.20 | 0.97 | 3.0 | 0° C. | 2.8 | 60 | 24 |
| Comparative Example 4 | 14.90 | 0.60 | 1.40 | 0.95 | 3.0 | 0° C. | 2.8 | 60 | 24 |

TABLE 3

| | Composition of Positive Electrode Active Material $LiNi_xCo_yMn_zO_2$ | | | | relation between y and z: y − z | Additive | Additive Concentration (weight %) | Negative Electrode Active Material |
|---|---|---|---|---|---|---|---|---|
| | x | y | z | x/(y + x) | | | | |
| Example 12 | 0.50 | 0.30 | 0.20 | 1.00 | 0.10 | LiBOB | 1.00 | LTO(S) |
| Example 13 | 0.50 | 0.30 | 0.20 | 1.00 | 0.10 | — | 0.00 | LTO(S) |
| Comparative Example 5 | 0.80 | 0.20 | 0.20 | 2.00 | 0.00 | LiBOB | 1.00 | LTO(S) |
| Comparative Example 6 | 0.80 | 0.20 | 0.20 | 2.00 | 0.00 | LiBOB | 1.30 | LTO(S) |
| Comparative Example 7 | 0.50 | 0.30 | 0.20 | 1.00 | 0.10 | LiBOB | 1.00 | LTO(S) |

TABLE 4

| | $A_C/A_{Ti}$ | $A_{Li}/A_C$ | p/n | Relative value of SOC at which rapid generation of heat occurred | Conditions of Initial Charging Cell Voltage (V) | Temperature (° C.) | Conditions of Aging Cell Voltage (V) | Temperature (° C.) | Time (Hr) |
|---|---|---|---|---|---|---|---|---|---|
| Example 12 | 8.82 | 1.03 | 1.40 | 1.11 | 3.0 | 25 | 2.8 | 60 | 24 |
| Example 13 | 2.34 | 1.46 | 1.40 | 1.11 | 3.5 | −10 | 2.8 | 60 | 24 |
| Comparative Example 5 | 2.13 | 1.48 | 2.00 | 1.01 | 3.0 | 0 | 2.8 | 60 | 24 |
| Comparative Example 6 | 2.56 | 1.44 | 2.00 | 1.03 | 3.0 | 0 | 2.8 | 60 | 24 |
| Comparative Example 7 | 12.10 | 0.80 | 1.40 | 0.96 | 3.0 | 45 | 2.8 | 60 | 24 |

The results of Tables 2 and 4 show that in the nonaqueous electrolyte batteries of Examples 1 to 13 in which the value of x/(y+z) was from 0.1 to 1.3, the ratio $A_C/A_{Ti}$ was from 2 to 10, the ratio $A_{Li}/A_C$ was from 1.0 to 1.5, and the ratio p/n was from 1.2 to 2, the SOC at the point at which rapid generation of heat occurred was higher than that in the nonaqueous electrolyte battery of Comparative Example 1. This result shows that the nonaqueous electrolyte batteries of Examples 1 to 13 had improved safety since the generation of heat can be suppressed by suppressing the reductive reaction of the electrolyte solution on the negative electrode surface and the excessive insertion of Li into the negative electrode active material particles during over-charge can be prevented.

On the other hand, the SOC at which rapid generation of heat occurred in the nonaqueous electrolyte battery of Comparative Example 1 was lower than that in the nonaqueous electrolyte batteries of Examples 1 to 13. This is considered to be because, in the nonaqueous electrolyte battery of Comparative Example 1, no additive was included in the electrolyte solution and the ratio $A_C/A_{Ti}$ was as low as 1.0, and therefore the reductive reaction of the electrolyte solution on the negative electrode during over-charge could not be suppressed.

In Comparative Examples 2 and 3, the SOC at which rapid generation of heat occurred was lower than that in Comparative Example 1. This is considered to be due to the following reasons. In the nonaqueous electrolyte battery of Comparative Example 2, since the value of x/(y+z) was greater than 1.3 meaning that the ratio of nickel in the nickel-cobalt-manganese composite oxide was high, the valence of nickel increased during over-charge. In the nonaqueous electrolyte battery of Comparative Example 3, since x/(y+x) was less than 0.3 meaning that the ratio of cobalt was high, the positive electrode potential increased. It is assumed that due to this, in the nonaqueous electrolyte batteries of Comparative Examples 2 and 3, the thermal stability of the positive electrode was low, and therefore the influence on the positive electrode due to the heat generated from the negative electrode resulted in rapid generation of heat.

In Comparative Example 4, the SOC at which rapid generation of heat occurred was still even lower. This is considered to be because, in Comparative Example 4, the amount of the additive was as high as 2.7% by weight, and an insulating protective layer including C was formed on the negative electrode surface in excess. It is assumed that the insulating performance of the negative electrode during over-charge had become excessive due to the insulating protective layer formed in excess, and the potential rapidly decreased due to over-voltage.

In Comparative Examples 5 and 6, the SOC at which rapid generation of heat occurred was higher than that of the nonaqueous electrolyte battery of Comparative Example 2, but was lower than that of the nonaqueous electrolyte batteries of Examples 1 to 13. This is considered due to the following reasons. In the nonaqueous electrolyte batteries of Comparative Examples 5 and 6, since the value of x/(y+z) was larger than 1.3 meaning that the ratio of nickel in the nickel cobalt manganese composite oxide was high, the valence of nickel increased during over-charge. It is assumed that since the influence of this was great, even though the value of $A_C/A_{Ti}$ was larger than 2, exothermic reaction occurred in the positive electrode due to the heat generated from the negative electrode, resulting in rapid generation of heat.

In Comparative Example 7, the SOC at which rapid generation of heat occurred was lower than that in the nonaqueous electrolyte batteries of Examples 1 to 13. This is considered to be because, since the temperature during initial charging of the battery unit was as high as 45° C., the insulating protective layer including C was formed on the negative electrode surface in excess or the protective layer was formed in a segregated manner. In Comparative Example 7, similarly as in Comparative Example 4, it is assumed that the insulating performance of the negative electrode during over-charge had become excessive due to the insulating protective layer formed in excess or formed in a segregated manner, and the potential rapidly decreased due to over-voltage.

As shown in the results of Tables 2 and 4, as such, the nonaqueous electrolyte batteries of Examples 1 to 13 are able to suppress heat generation during over-charge more so than the nonaqueous electrolyte batteries of Comparative Examples 1 to 7 are able, and therefore the nonaqueous electrolyte batteries of Examples 1 to 13 can exhibit improved stability as compared to the nonaqueous electrolyte batteries of Comparative Examples 1 to 7.

In Examples 1 to 12, it is assumed that the additive added to the electrolyte solution had mainly reductively decomposed on the negative electrode surface during initial charging, whereby the protective film was formed. On the other hand, in Example 13, it is assumed that the electrolyte solution itself had reductively decomposed on the negative electrode to form the protective film.

In the nonaqueous electrolyte battery of at least one of the embodiments and examples described above, the negative electrode includes an oxide of titanium and has a surface state in which the ratio $A_C/A_{Ti}$ is from 2 to 10 and the ratio $A_{Li}/A_C$ is from 1.0 to 1.5. In the nickel-cobalt-manganese composite oxide $Li_{1-a}Ni_xCo_yMn_zO_2$ included in the positive electrode, the subscripts x, y, and z satisfy the inequality $0.1 \leq (y+z) \leq 1.3$. Further, the ratio p/n of the positive electrode capacity to the negative electrode capacity is from 1.2 to 2.0. Thus, even in an overcharged state, the nonaqueous electrolyte battery can both suppress heat generation caused by a side reaction on the surface of the negative electrode active material and suppress rapid generation of heat from the positive electrode. As a result, the nonaqueous electrolyte battery according to the embodiment can exhibit improved safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   a negative electrode including an oxide of titanium, the oxide of titanium comprising a protective coating on a surface thereof, an Li-atom abundance ratio $A_{Li}$, Ti-atom abundance ratio $A_{Ti}$, and C-atom abundance ratio $A_C$ of the protective coating according to a photoelectron spectroscopy measurement satisfies inequalities $2 \leq A_C/A_{Ti} \leq 10$, and $1.0 \leq A_{Li}/A_C \leq 1.5$;
   a positive electrode including a nickel-cobalt-manganese composite oxide which is represented by a composition formula $Li_{1-a}Ni_xCo_yMn_zO_2$, subscripts x, y, and z satisfy inequalities $0.1 \leq x/(y+z) \leq 1.3$, y>0, and z>0 and subscript a satisfies an inequality $0 \leq a \leq 1$; and
   a nonaqueous electrolyte,
   wherein a ratio p/n of a capacity p of the positive electrode to a capacity n of the negative electrode is within a range of 1.2 to 2.

2. The nonaqueous electrolyte battery according to claim 1, wherein the subscripts x, y, and z satisfy inequalities $0.3 \leq x/(y+z) \leq 1.3$ and $y \geq z$.

3. The nonaqueous electrolyte battery according to claim 2, wherein the subscripts x, y, and z satisfy inequalities $0.6 \leq x/(y+z) \leq 1$ and $y \geq z$.

4. The nonaqueous electrolyte battery according to claim 2, wherein the oxide of titanium is at least one selected from a group consisting of a lithium-titanium composite oxide having a spinel structure, a lithium-titanium composite oxide having a ramsdellite structure, a monoclinic titanium dioxide, and a monoclinic niobium titanium composite oxide.

5. The nonaqueous electrolyte battery according to claim 2, further comprising:
   a container housing the negative electrode, the positive electrode, and the nonaqueous electrolyte,
   wherein the container has a thickness being within a range of 0.2 to 5 mm, and the container is a metal container comprising at least one metal selected from a group consisting of Fe, Ni, Cu, Sn, and Al.

6. The nonaqueous electrolyte battery according to claim 2, further comprising a container housing the negative electrode, the positive electrode, and the nonaqueous electrolyte,
   wherein the container has a thickness being within a range of 0.1 to 2 mm, and the container is a laminate film container comprising a metal layer comprising at least one metal selected from a group consisting of Fe, Ni, Cu, Sn, and Al, and resin layers sandwiching the metal layer.

7. A battery pack comprising the nonaqueous electrolyte battery according to claim 1.

8. The battery pack according to claim 7, wherein the battery pack comprises six of the nonaqueous electrolyte batteries connected electrically in a series.

9. The battery pack according to claim 7, wherein the battery pack comprises a plurality of battery modules each comprising six of the nonaqueous electrolyte batteries, the plurality of battery modules being connected electrically in a series, in parallel, or in a combination of a connection in a series and a connection in parallel.

* * * * *